(12) United States Patent
Bird (10) Patent No.: US 11,279,192 B2
(45) Date of Patent: Mar. 22, 2022

(54) VEHICLE SUSPENSION

(71) Applicant: Alan Bryn Bird, London (GB)

(72) Inventor: Alan Bryn Bird, London (GB)

( * ) Notice: Subject to any disclaimer, the term of this patent is extended or adjusted under 35 U.S.C. 154(b) by 24 days.

(21) Appl. No.: 16/628,081

(22) PCT Filed: Jul. 2, 2018

(86) PCT No.: PCT/GB2018/000099
§ 371 (c)(1),
(2) Date: Jan. 2, 2020

(87) PCT Pub. No.: WO2019/008306
PCT Pub. Date: Jan. 10, 2019

(65) Prior Publication Data
US 2021/0146740 A1 May 20, 2021

(30) Foreign Application Priority Data

Jul. 2, 2017 (GB) .................................. 1710583
Apr. 3, 2018 (GB) .................................. 1805462

(51) Int. Cl.
*B60G 11/42* (2006.01)
*B60G 7/00* (2006.01)
(Continued)

(52) U.S. Cl.
CPC .............. *B60G 11/42* (2013.01); *B60G 7/001* (2013.01); *B60G 7/02* (2013.01); *B60G 21/02* (2013.01);
(Continued)

(58) Field of Classification Search
CPC ...... B60G 21/02; B60G 21/04; B60G 21/045; B60G 21/055; B60G 17/033; B60G 5/04;
(Continued)

(56) References Cited

U.S. PATENT DOCUMENTS 1,928,545 A * 9/1933 Rondier ................. B60G 21/04
280/104
2,067,640 A * 1/1937 Madden ................. F16F 9/504
267/186
(Continued)

FOREIGN PATENT DOCUMENTS

DE 1274453 B 8/1968
DE 4115550 A1 11/1991
(Continued)

OTHER PUBLICATIONS

International Search Report, dated Oct. 22, 2018, from corresponding PCT application No. PCT/GB2018/000099.
(Continued)

*Primary Examiner* — Paul N Dickson
*Assistant Examiner* — Caitlin Anne Miller
(74) *Attorney, Agent, or Firm* — Nixon & Vanderhye (57) ABSTRACT

A vehicle suspension for supporting the body or chassis of a vehicle includes suspension arms positioned at opposite sides and at one end of a vehicle and two suspension arms positioned respectively at opposite sides and at one end of a vehicle, each arm mounted for pivotal movement about a respective hinge axis. A balancing hub is attached to the vehicle body or chassis with at least one part of the hub free to rotate relative to the vehicle body or chassis about at least one pivotal position. Each suspension arm is connected to the hub at a position of the suspension arm spaced from a respective hinge axis whereby pivotal movement of the suspension arm applies a force to the hub. In use, the force opposes the force from another suspension arm at at least one of the same side and the same end of the vehicle suspension.

27 Claims, 5 Drawing Sheets

(51) Int. Cl.
*B60G 7/02* (2006.01)
*B60G 21/02* (2006.01)

(52) U.S. Cl.
CPC .... *B60G 2200/13* (2013.01); *B60G 2202/112* (2013.01); *B60G 2202/14* (2013.01); *B60G 2202/24* (2013.01); *B60G 2204/143* (2013.01)

(58) Field of Classification Search
CPC ...... B60G 7/02; B60G 7/001; B60G 2202/14; B60G 2202/24; B60G 2202/112; B60G 2204/143; B60G 2200/13
See application file for complete search history.

(56) References Cited

U.S. PATENT DOCUMENTS

| | | | | |
|---|---|---|---|---|
| 3,154,317 | A | * | 10/1964 | Gerhard ................. B60G 21/04 280/104 |
| 5,839,741 | A | * | 11/1998 | Heyring ................. B60G 21/04 280/124.106 |
| 6,942,230 | B1 | * | 9/2005 | Fontdecaba Buj .... B60G 11/16 280/124.104 |
| 2011/0084461 | A1 | * | 4/2011 | Bird ....................... B60G 21/05 280/124.128 |
| 2012/0053788 | A1 | * | 3/2012 | Amino ................... B60G 21/02 701/37 |

FOREIGN PATENT DOCUMENTS

| | | | | |
|---|---|---|---|---|
| FR | 608229 | A | * 7/1926 | ........... B60G 21/045 |
| FR | 835481 | A | 12/1938 | |
| FR | 1281427 | A | * 1/1962 | ............ B60G 21/04 |
| GB | 303949 | A | 1/1929 | |
| GB | 382606 | A | 10/1932 | |
| GB | 420978 | A | * 12/1934 | ........... B60G 21/045 |
| GB | 2460169 | A | 11/2009 | |
| SU | 1518149 | A1 | 10/1989 | |
| WO | 00/047434 | A1 | 8/2000 | |

OTHER PUBLICATIONS

GB Search Report, dated May 4, 2018, from corresponding GB application No. 1805462.7.

* cited by examiner

VEHICLE SUSPENSION

BACKGROUND OF THE INVENTION

Field of the Invention

This invention relates to a type of vehicle suspension comprising suspension arms and having zero or low warp stiffness. The invention provides also a vehicle comprising the suspension of the invention.

The suspension may comprise leading and trailing arms or semi-leading and semi-trailing arms. In this specification the expression "leading arm" will be used to include a semi-leading arm and the expression "trailing arm" will be used to include semi-trailing arm.

Description of the Related Art

Conventional vehicle suspensions, in which each wheel has a spring connecting it to the chassis, suffer from the problem that as one wheel is lifted then load is removed from or reduced at other wheels. In consequence traction for acceleration or braking is, sometimes dramatically, reduced. Zero warp stiffness suspensions do not suffer from this problem as the wheel loads are unaffected by the rise and fall of the wheels.

Common agricultural tractors are one type of zero warp stiffness suspension in which the front beam axle is pivoted, usually frictionlessly, about a central fulcrum. Warp is characterised by two diagonally opposite wheels rising while the remaining two wheels fall. In other words the contact patches between the wheels and the road do not remain all in the same plane. Zero warp stiffness is characterised by this motion happening without any resistance. Warp is important because any wheel going over any bump or hole generates a warp. It is the most common form of distortion from all the contact patches being in the same plane. Other types of wheel movements are: any two wheels together (sleeping policeman); all four wheels together (heave). These two leave the contact patches in the same plane and have to be contrived or occur naturally at random only infrequently. An undesirable feature of common agricultural tractor suspension is that nearly all the vehicle mass is attached to the rear wheels and therefore the motion of the whole vehicle responds to just two wheels thereby maximising the discomfort of the driver and disrupting the general dynamic performance of the vehicle. It will be appreciated that as the wheel reactions at the contact patches remain roughly constant then there is also minimal torsion applied to the body or chassis. It is desirable to resolve and exploit these issues whilst also saving vehicle weight and avoiding complexity.

The smoothness and comfort of a vehicle is most easily visualised by considering what causes discomfort. The bodies of vehicle occupants feel forces which are directly related to accelerations. Accelerations may be linear or angular and it is the angular accelerations that cause the greatest discomfort and are most difficult to mitigate. The present invention seeks to mitigate angular accelerations. Other desirable features include mitigating variations in wheel loads, torque stresses and deflections in the chassis/body, reducing the high load attachments points on the body/chassis to just the hinge connection of the suspension arms and reducing the number of suspension components. Addressing these matters not only reduces discomfort but also reduces the weight of the vehicle and thereby saves fuel and manufacturing cost.

Various known suspension systems include:

WO 00/47434 Zapletal. This suspension system requires 'first and second balance members'. In various manifestations these are melded into one but in all cases accumulate all of the suspension forces and balance them against one or two springs which therefore have to resist the sum of all the suspension forces which would typically be two to four times the weight of the whole vehicle. Further this system has no inherent pitch stability and has to be augmented by a torsion bar for this purpose before it is an adequate suspension system.

DE 4115550 Bufler/Volkswagen. This system is not a zero warp stiffness system but has a hydraulic balancing system. This needs other devices in order to have either roll stability or pitch stability depending on which orientation is being used. The other devices shown are torsion bars but hydraulic inputs could be used.

U.S. Pat. No. 6,942,230 Fontdecaba Buj. This system is based on connecting diagonally opposite suspension arms such that as one wheel rises the diagonally opposite wheel also rises and they are connected together without springing. This device as depicted in FIGS. 1 to 8 is not capable of acting as a suspension system but only as an auxiliary system to some other system that suspends the vehicle. One problem with the basis of this invention is that linking two diagonally opposed wheels together without any resilience other than the small resilience in the length of the links, is that the unsprung mass of the two directly linked wheels necessarily acts as one. This means the effective unsprung mass adversely affecting the dynamic performance of each wheel is doubled. A further problem is that when one wheel rises over a bump as the result of the application of extra road reaction at that wheel then the diagonally opposite wheel also rises thereby relieving that wheel of road reaction. The increased road reaction on the first wheel times the distance to the vehicle centre of gravity gives a diagonal (combination of pitch and roll) angular acceleration and the reduction in the road reaction on the second wheel times it's distance to the vehicle centre of gravity also gives an angular acceleration in the same direction thus roughly doubling the angular acceleration and thereby maximising the discomfort.

The introduction of springs in FIG. 9 onwards enables the system to suspend the vehicle but does not address the fundamental flaws just described. The springs introduced necessarily have to act on two directly connected wheels simultaneously and thus collect both suspension forces. In the permutation in which there is only one spring, that spring collects two wheel suspension forces on each side which can be of the order of two to four times the weight of the vehicle. These are very large forces and demand a commensurate strong chassis adding weight to the vehicle. A worse effect of this, however, is that the effective spring rate for each wheel is that of the spring and this spring resists multiples of the weight of half the vehicle. This makes it impossible to achieve a desirable balance between heave rate and individual wheel rate because they are the same. The introduction of the balance beam in FIG. 13 mitigates this problem to some extent and enables zero warp stiffness but in the process the beam fulcrum accumulates all of the suspension forces equivalent to multiples of the whole weight of the vehicle.

GB2460169 Bird. This requires that in order for the transverse links to have a moment arm about the suspension arm hinge axis, the hinge axis has to have a significant angle relative to the 90 degree transverse direction. This compromises the available suspension geometry and limits the location of the links which need priority over other components of the vehicle.

BRIEF SUMMARY OF THE INVENTION

The present invention seeks to provide a vehicle suspension which is an improvement over hitherto known vehicle suspensions of the type having zero or low warp stiffness.

In accordance with one aspect of the present invention there is provided a vehicle suspension for supporting the body or chassis of a vehicle, said suspension comprising two suspension arms for positioning respectively at opposite sides and at one end of the vehicle and two suspension arms for positioning respectively at opposite sides and at the other end of the vehicle, each said arm being mounted for pivotal movement about a respective hinge axis, the suspension further comprising a balancing hub for attachment to the vehicle body or chassis in a configuration in which at least one part of the balancing hub is free to rotate relative to the vehicle body or chassis about at least one pivot position, and each suspension arm being connected to the balancing hub at a position of the suspension arm spaced from a respective hinge axis whereby pivotal movement of the suspension arm about the hinge axis applies a force to the balancing hub and wherein, in use, said force opposes the force from another suspension arm at at least one of the same side and the same end of the vehicle suspension.

In accordance with another aspect of the present invention there is provided a vehicle comprising a body or chassis having secured thereto a suspension of the invention.

The vehicle suspension may comprise two leading or semi-leading suspension arms for positioning respectively at opposite sides and at one end of a vehicle and two trailing or semi-trailing suspension arms for positioning respectively at opposite sides and at the other end of a vehicle. Alternatively the suspension arms may comprise sideways projecting arms or wishbones with or without auxiliary wishbones to control the camber change and/or roll centre.

The balancing hub may, by design, augment and/or provide springing for the system.

Pivotal movement of the suspension arm about the hinge axis may be arranged to apply a force which opposes approximately in magnitude and direction a force from another suspension arm on the same side and/or the same end.

An aspect of the invention is that the wheels are not connected directly in diagonally opposed pairs so that in a configuration in which there are springs between the suspension arms and the balancing hub pivot, this provides that the force paths, and hence the spring rates and masses mobilised, between any one suspension arm and each of the other three is different thereby ensuring that the dynamic movements of all wheels are out of phase and the potential for mutual mass damping is maximised. Resonance between symmetrical pairs is still possible and if necessary the weights of members and/or spring rates are adjusted anywhere in the system to negate any mass/spring symmetry.

Accordingly it is to be understood that the present invention facilitates provision of vehicle suspension arms without placing geometrical constraints on the selection of the orientation of the hinge axes of the arms. Selection of the orientation of hinge axes may be based purely on the desired geometry from the point of view of the dynamic motion of the vehicle and its components. It can include the common case with leading and trailing arm suspensions in which the hinge axes are at 90 degrees to the vertical longitudinal plane in the direction of vehicle travel and also the common case in which the hinge axes are parallel to said longitudinal plane.

A feature of the present invention is that by linking the suspension arms via springs and providing a slight difference in unsprung mass and spring rates (it will be difficult to avoid a difference in unsprung mass between front and rear in any case) then the wheels can act as mutual mass dampers for each other. This will mitigate and in some cases eliminate the need for conventional dampers. Thus there is an improved facility for a designer to exploit this advantage.

Figure 5:
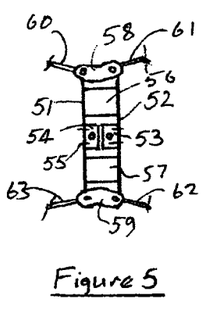
FIG. 5 is a plan view of part of a suspension in accordance with a third embodiment of the invention, this comprising a balancing hub, leaf springs, elastomeric springs, pivot blocks and links.
Figure 7:
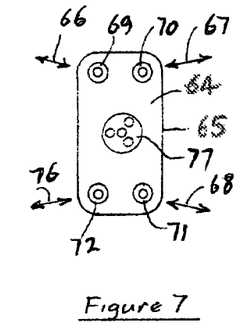
FIG. 7 is a plan view of a fifth embodiment. This view is similar to FIG. 6 except that the fulcrum has multiple fixings which rigidly attach it to the body or chassis and the hub rotates by means of shear deformation of the elastomer.

The arms may each be connected, at a point on the arm which has a lever arm about the hinge axis, to a balancing hub which is free to rotate about a pivot or pivots mounted on the chassis or body of the vehicle. The rotation of the hub will preferably, but not essentially, be about a vertical or near vertical axis relative to the chassis. It will be appreciated that it is possible to provide a hub which has a horizontal or other axis of rotation. The rotating pivot may be freely rotatable or may be varied from fully free to fully restricted in which case, with full restriction, the suspension will revert to the action and characteristics of a conventional suspension. The below described FIGS. 5 and 7 are examples pf means of achieving this. There may be provided means for controlling the rate or extent of rotation relative to the body or chassis of a vehicle by means such as friction devices or viscous dampers which may be of a type preset or variable in use of the suspension. At least one suspension arm may be connected directly to the balancing hub, the connection to the balancing hub being at a position of the suspension arm which is spaced from the hinge axis of the suspension arm.

The connection between at least one arm and the balancing hub may be via a link between the arm and the balancing hub, each link attached by means such as rod end joints, ball joints or universal joints or by being integral with the balancing hub. A link may be of fixed length; alternatively the link containing or not means of adjustment and/or a spring; or the link may itself be a spring. Each suspension arm may be connected to the balancing hub via a link or only some may be connected via a link A link may be continuous with the balancing hub either by means of a rigid connection or by being a continuous part of the balancing hub. The hub may be a single component or an assembly of components and, within itself, may be rigid, semi-rigid or a mechanism of rigid and semi-rigid components. The hub may be a solid with a pivoted attachment to the chassis or body of a vehicle about which it rotates, the solid being rigid or resilient and having means for attachment to each of the suspension arms via a link. The hub may be a single high modulus of elasticity resilient member or an assembly of high modulus of elasticity springs and reacting components. The hub may be an assembly of high and low modulus of elasticity components arranged so as to give a desired resilience.

Instead of a single pivoted attachment of the hub to the chassis or body there may be multiple point attachments or multiple single point attachments such that the rotation is restricted but enabled by virtue of the resilience of components within the rotating member assembly.

The input forces to the balancing hub will normally be arranged so that vertical movement of one arm (due to movement of a ground engaging member such as a wheel or caterpillar type track) tends to induce opposite vertical movement in its two adjacent arms. It will be appreciated that the arms acting about their hinges and via the lever arm to their connections may pull or may push on the balancing hub. It will be appreciated that the whole system could be turned through 90 degrees so that the arms project sideways and forces from the arms are roughly 90 degrees to the longitudinal plane. In this configuration camber change and high roll centre potentially become issues and it would be advantageous to add another wishbone approximately parallel to the component that has herein been referred to as a suspension arm (but may also be in the form of a wishbone) to control the camber angle change and roll centre in a conventional manner. Bump stops may be provided by limiting the angle through which the balancing hub can rotate. The balancing hub may comprise one or more suitably proportioned and profiled solids which are connected by means of resilient materials or components such that the rotation is achieved by means of deformation of these resilient materials or components.

A or each link may extend from the balancing hub to a position of a respective suspension arm which is above or which is below a plane containing the hinge axis of that suspension arm.

The balancing hub may have the form of a solid body pivotally fixed at its centre point to a convenient part of the chassis and having its attachment points for the leading and trailing arms evenly distributed around the solid body. Alternatively attachment points may be unevenly distributed in order to achieve a particular desired effect.

The connection of the arms to the balancing hub may be via links with universal joints, ball joints or rod ends at each connection. The links may be substantially rigid members or may be resilient members or may contain springs. It will normally be convenient for the links or at least one of their connections to include means for adjustment. The balancing hub may be a solid body of rigid or resilient materials and may contain sprung or resilient elements such that the input from one arm has not a direct affect on the other arms but instead a resilient affect. A link may be continuous with the balancing hub either by means of a rigid connection or by being a continuous part of the balancing hub, such as an integral part of the balancing hub. The solid body may be resilient material such as rubber or another type of elastomer. The solid body may be a resilient material stiffened or reinforced with stiffer materials and have built-in attachment points for attachment to links or arms.

The balancing hub may take the form of an assembly of resilient components such as metal springs. The attachment(s) for securing the balancing hub to a vehicle body or chassis may be free running or may offer resistance to turning and may have more than one fixing so that the rotation is achieved by the resilience of the material or springs. Thus the suspension designer is afforded the facility of maximum choice between conventional suspension action when the hub is rigid and rigidly fixed to the vehicle body or chassis and this type of zero warp stiffness suspension when the hub is fully free to rotate frictionlessly, and any combination between these two options including a facility for variation of resistance to rotation during use of the suspension. The links and balancing hub may be melded and take the form of one continuum of resilient material or springs rigidly attached to and emanating from a fulcrum block. The links may be in the same plane as the hub or may approach the hub at an angle. The arms may be configured to transmit tension or compression forces to the balancing hub.

It will be appreciated that a well balanced design in accordance with this invention will result in the forces acting on the balancing hub pivot or fulcrum tending towards zero when the vehicle is at rest. When the vehicle is not at rest the main function of the balancing hub is to maintain pitch stability and to collect and distribute transient dynamic forces from the suspension arms.

It will be further appreciated that a suspension system in accordance with this invention typically will always be part of a whole vehicle comprising other components competing for space and components necessary to achieve the necessary geometric characteristics of a modern suspension system. It is therefore likely that the links will need to be diverted to deal with space constraints and suspension geometry demands will mean that the suspension arms will have auxiliary components to achieve desired geometry. The links may therefore contain diversion means for diversion of the forces through angles, that is, along a non linear path. The suspension arms may have associated therewith auxiliary components to achieve desirable geometry for the movement of the wheels of a vehicle.

BRIEF DESCRIPTION OF THE DRAWINGS

Embodiments of the invention will now be described, by way of example only, by reference to the accompanying drawings in which.

DETAILED DESCRIPTION OF THE PREFERRED EMBODIMENTS

Figure 1:
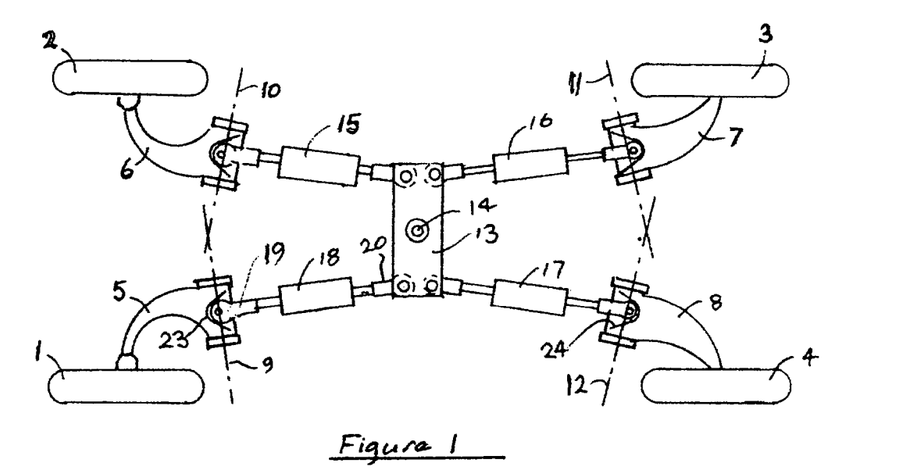
FIG. 1 is a plan view of a compression type configuration of the suspension components of a vehicle in accordance with a first embodiment of the invention and in which all other vehicle components are omitted.
Figure 2:
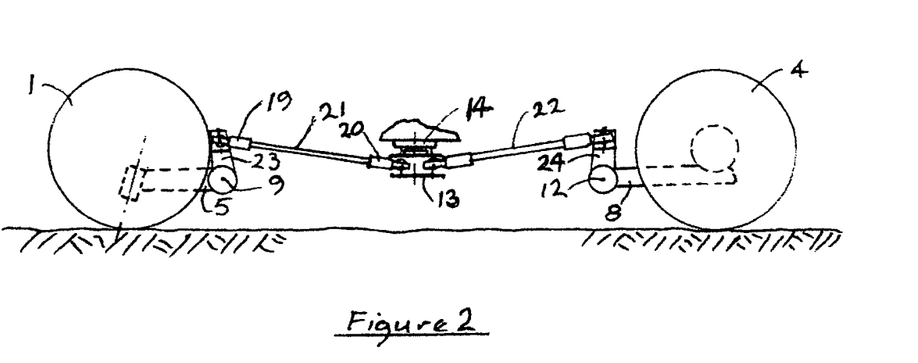
FIG. 2 is a side elevation of the compression type configuration of the suspension components of FIG. 1 except that the springs 15-17 are replaced by solid rods 21, 22, e.g. rods of fixed length. All other vehicle components are omitted except for a fragment of the chassis or body about which the balancing hub rotates.

As shown in FIGS. 1 and 2 wheels 1, 2, 3 and 4 are mounted at the outer ends of semi-leading arms 5 and 6 and semi-trailing arms 7 and 8. These are mounted so as to rotate about axes 9, 10, 11 and 12, which axes are orientated for optimum dynamic performance separate from the concerns of this invention. A balancing hub, in this case in the form of a plate or pair of plates 13 is pivotally mounted to the chassis by boss 14.

Sprung links 15, 16, 17 and 18 connect between the balancing hub 13 and the upper part of upward extensions of the arms typically shown as 23 and 24 by means of rod ends typically shown as 19 and 20. It will be appreciated that rod ends 19 and 20 could be replaced by ball joints or universal joints. Upward forces from the ground acting on the wheels 1, 2, 3 and 4 turn the arms 5, 6, 7 and 8 and via the upward extensions typically shown as 23 and 24 compress the sprung links 15, 16, 17 and 18 and transfer forces to the hub 13 where they mutually oppose and balance each other. As shown here this is a compression version of the invention wherein the arms push on the balancing hub. The push doesn't have to be transmitted via sprung links and in FIG. 2 an alternative is shown using solid rods 21 and 22 as this invention works well with or without springs even though it will be appreciated that the tires provide some spring effect. Springs have a beneficial softening effect but it doesn't matter where in the system or how you introduce them.

Figure 3:
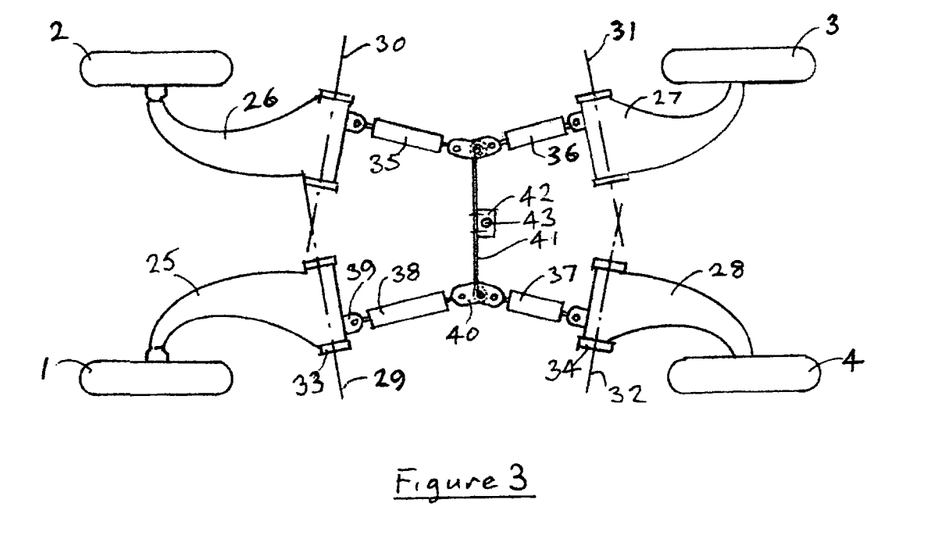
FIG. 3 is a plan view of a tension type configuration of the suspension components of a second embodiment of the invention and in which all other components have been omitted.
Figure 4:
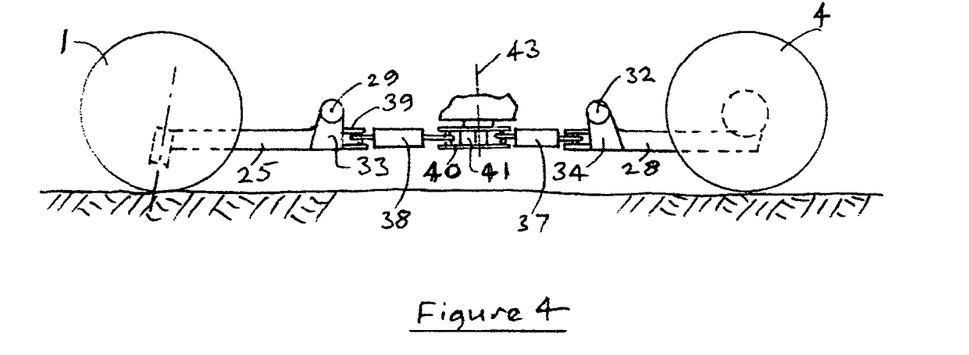
FIG. 4 is a side elevation of the tension type configuration of the suspension components of FIG. 3 and in which all other components have been omitted except for a fragment of the body or chassis about which the hub rotates.

In FIGS. 3 and 4, showing a tension version of this invention, the arms 25, 26, 27 and 28 via sprung links 35, 36, 37 and 38 and connections, typically shown as 40 pull on the balancing hub which comprises a leaf spring 41 mounted on fulcrum block 42 which pivots about vertical axis 43. Wheels 1, 2, 3 and 4 are mounted on arms 25, 26, 27 and 28. These arms are different from those shown in FIGS. 1 and 2 in that they are longer for reasons not of concern to this invention and they have upward extensions typically shown as 33 and 34 which extensions have bosses for enabling the arms to rotate about axes 29, 30, 31 and 32 and, as low as possible, brackets typically shown as 39 for attachment of the sprung links. It will be appreciated that, as in FIGS. 1 and 2, the sprung links 35, 36, 37 and 38 may be replaced by solid rods, for example rods of fixed length.

Figure 5A:
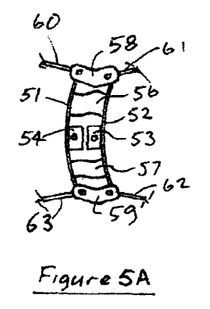
FIG. 5A corresponds substantially with FIG. 5 but shows the effect of link forces bending the leaf springs, shearing the elastomeric springs and leaving the pivot blocks substantially unturned.
Figure 5B:
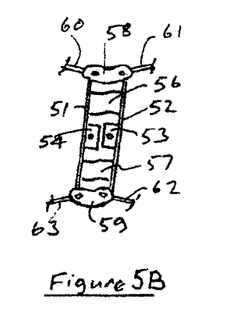
FIG. 5B corresponds substantially with FIG. 5 but with the link forces turning the pivot blocks and shearing the elastomeric springs, leaving the leaf springs substantially straight (it will be appreciated that in use the balancing hub will be in a state which combines these modes in random proportions)

FIGS. 5, 5A and 5B show in plan the same balancing hub assembly in three different states of balance caused by the force inputs from links 60, 61, 62 and 63. In FIG. 5 the hub is in a neutral state which would approximate to the normal, at rest condition where all of the inputs from the links are substantially balanced, resulting in minimal residual force on the center pivots or swivel blocks 53, 54. The links are attached to hub links 58 and 59 to which are also attached the leaf springs 51 and 52 located by swivel blocks 53 and 54 to which they are attached by means of fixings typically indicated by 55. Between the leaf springs 51 and 52 are adhered elastomeric shear blocks 56 and 57. In this state the only significantly stressed elements are the links and hub links. In this state the only significantly stressed elements are the links, including the hub links.

FIG. 5A depicts the state when the force inputs from links 60 and 63 are greater than the force inputs from links 61 and 62 such that both the leaf springs 51 and 52 bend and the elastomeric blocks 56 and 57 deflect in a shear mode as indicated. A force balance is maintained by forces transmitted via fulcrum blocks 53 and 54 from the pivotal fixings on the body or chassis. In this state all components are significantly stressed and it is likely to be a transient state such as when passing over a sleeping policeman but a mild form of this type of deflection could also arise from an imbalance of fore and aft load distribution.

FIG. 5B depicts a state in which force inputs from links 60 and 62 are greater than those from links 61 and 63 the balance being restored by means of deflection of the elastomeric blocks 56 and 57 which induce tension and compression forces and some bending into the leaf springs 51 and 52 which are resisted and balanced by forces from the fulcrum blocks 53 and 54 which, it should be noted, will be substantially at right angles to the forces described for the state shown in FIG. 5A. This will almost always be a transient state such as when one wheel passes over a bump or hollow but could also arise if the vehicle were parked with one wheel on a bump or hollow. It will be appreciated that these states are illustrations of arbitrary and usually transient states and real conditions will be random combinations of all three. It will also be appreciated that the elastomeric blocks may be omitted, in which case the balancing hub is split into two spaced apart but linked balancing hubs that serve the same purpose as a single hub.

Figure 6:
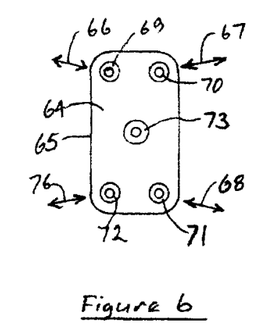
FIG. 6 is a plan view of a balancing hub in accordance with a fourth embodiment of the invention, this hub comprising a solid elastomeric block with pivot fixing points for links and a central fulcrum with force inputs from links indicated.

FIG. 6 shows in plan a balancing hub comprising an elastomeric block 64 with inserts 69, 70, 71 and 72 to which links from the arms are attached, the forces from the arms represented by 66, 67, 68 and 76. A further insert 73 in the middle is the means for attachment to a pivot fixing on the body or chassis. The elastomeric block may be enhanced by a perimeter band 65 preferably made from a flexible high modulus of elasticity material. The action of the block closely follows the description for FIGS. 5, and 5A, but the whole block can turn and there is no way for it to get turning resistance from the fulcrum insert 73 so cannot form a parallelogram as depicted in 5B.

FIG. 7 shows in plan a balancing hub different from FIG. 6 only in that the fulcrum insert 77 has multiple fixings to the body or chassis and so is not turnable. Turning of the hub is by shear in the elastomer around the fulcrum insert and thereby the designer has another parameter to manipulate to get a desired effect.

Figure 8:
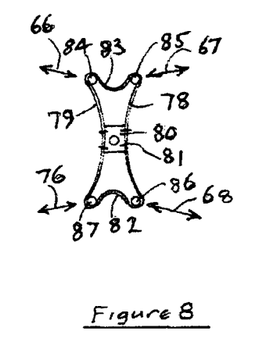
FIG. 8 is a plan view of a balancing hub of a sixth embodiment. This shows a balancing hub comprising shaped metal springs with pivot fixings for links and central fulcrum.

FIG. 8 shows a balancing hub comprising high modulus of elasticity spring material used as perimeter springs 78, 79, 82 and 83 which may be a continuous perimeter band into which are fixed attachment points 84, 85, 86 and 87 for links from the arms delivering forces represented by 66, 67, 68 and 76. To this arrangement of springs a central fulcrum block 80 is fixed using fixings typically represented by 81.

Springs 82 and 83 resist the forces 68 and 76 and forces 66 and 67 respectively and any out of balance between combined forces 66 and 76 and combined forces 67 and 68 is resisted by springs 79 and 78 respectively. It will be appreciated that a resilient fulcrum insert such as that of item 77 in FIG. 7 could be substituted for the type depicted as item 80.

It will be appreciated that the examples given in FIGS. 5 to 8 may be used in both tension and compression cases and the hubs having built in resilience the links attached to them may or may not contain springs but it may be preferable to omit springs from the links.

Figure 9:
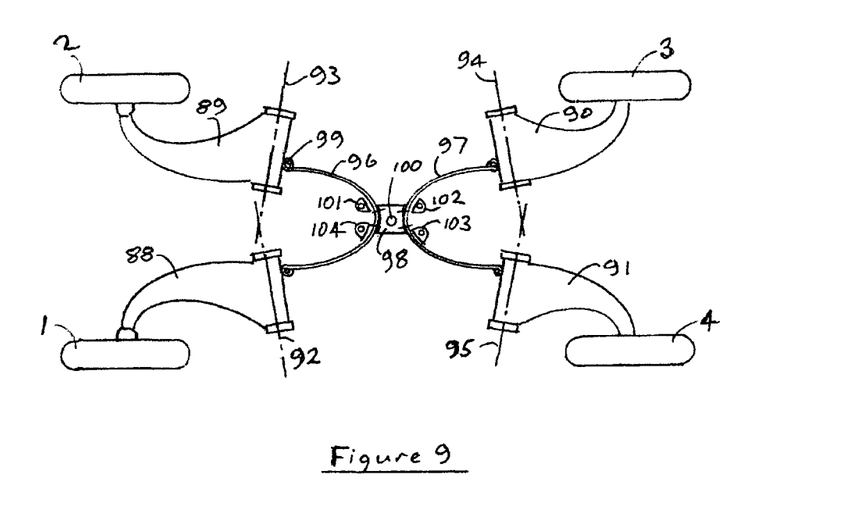
FIG. 9 is a plan view of a tension or a compression type configuration of the vehicle suspension components in accordance with a seventh embodiment of the invention in which the balancing hub and the links are melded together to take the form of two semi-elliptical springs which serve as links between the suspension arm hinge axes and a fulcrum block.

FIG. 9 shows an example of a suspension system in accordance with this invention incorporating a balancing hub in which the hub and the links are melded together into one unit. Wheels 1, 2, 3 and 4 are mounted on arms 88, 89, 90 and 91 free to rotate around axes 92, 93, 94 and 95. At a substantially vertical lever arm, either above or below the axes, are attached by suitable ball joint or universal joint not shown, but indicated typically by 99, springs 96 and 97 which are rigidly fixed to fulcrum block 98 free to rotate about vertical axis 100 located on the body or chassis of the vehicle. It will be apparent that out of balance forces applied at the ends of one spring will be resisted by rotation of the fulcrum block which in turn will rotate the other spring and thereby transmit movement and/or forces to the opposing arms and hence the wheels. It will be apparent that it does not matter whether the springs are arranged to be in tension or compression. It will further be apparent that it would not matter if each spring were in two parts, each part individually fixed rigidly to the fulcrum block. It will further be apparent that the springs and fulcrum block could be one continuum of resilient material. Bump stops 101, 102, 103 and 104 attached to the vehicle body or chassis may be provided to limit the degree of rotation of the balancing hub and such devices may be applied to any of the examples shown.

Figure 10:
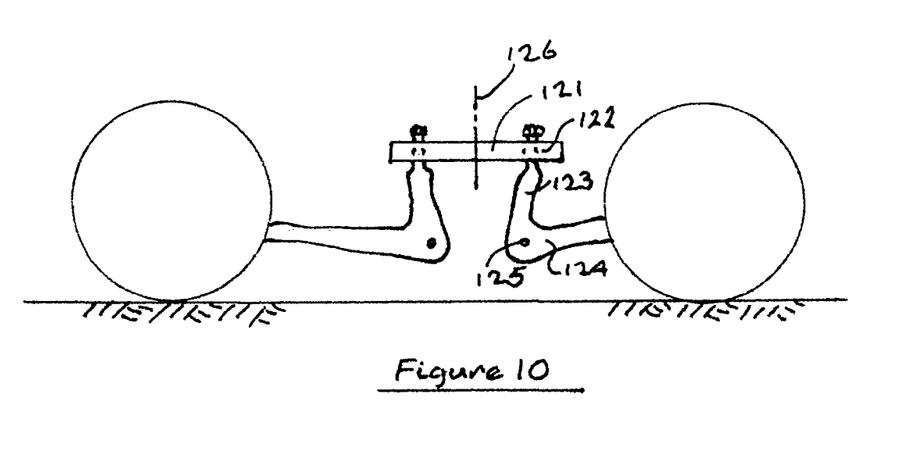
FIGS. 10 and 11 are, respectively, side and plan views of a suspension in accordance with another embodiment of the invention and in which the suspension arms are connected directly to the balancing hub.
Figure 11:
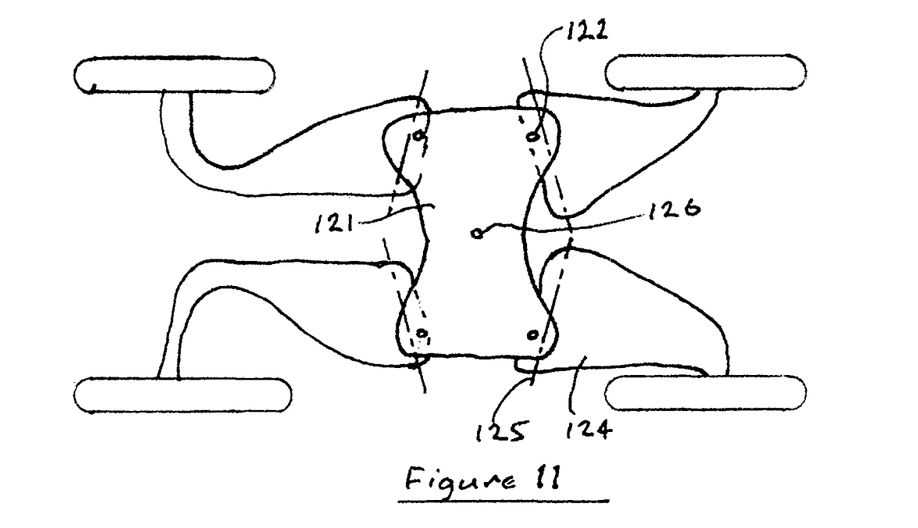

FIGS. 10 and 11 show a vehicle suspension which is devoid of the aforedescribed links. Instead a balancing hub 121, rotatable about a vertical axis 126, is connected at each of four positions 122 to an extension 123 of a respective suspension arm 124, at a position of the extension which is spaced from the suspension arm hinge axis 125. The connection of each extension to the hub may be by a conventional elastomeric bush of the type comprising inner and outer metal tubes having a sleeve of elastomeric material bonded therebetween. The outer tube is bonded to elastomeric material of the hub and the extension of the suspension arm extends into and is secured within the inner tube. However other forms of connection, such as ball joints may be employed.

A suspension of the type shown in FIGS. 10 and 11 is particularly suitable for small vehicles such as wheel chairs.

Figure 12:
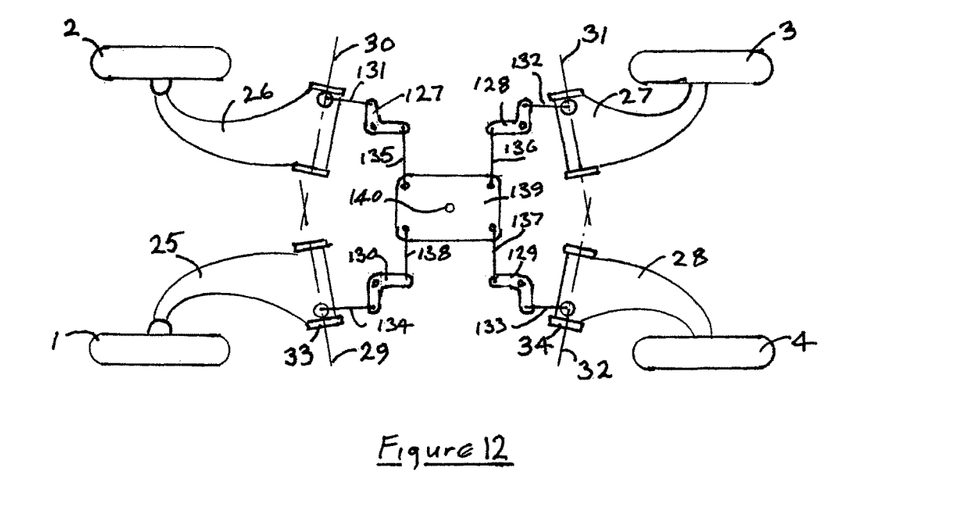
FIG. 12 is a plan view of a compression type suspension in which the links are diverted from longitudinal to transverse.

In FIG. 12 wheels 1, 2, 3 and 4 are mounted on arms 25, 26, 27 and 28 as in FIG. 3. Links 131, 132, 133, and 134 deliver forces from the suspension arms to elbow brackets 127, 128, 129 and 130 pivoted on the chassis about pivots at their elbows which divert the forces via continuation links 135, 136, 137 and 138 to central hub 139 mounted on the chassis (not shown) so as to rotate about central fulcrum 140. In this case the hub is depicted as being of an elastomeric type. In this configuration the links are shown above suspension arm hinge axes 29, 30, 31, and 32 and so the forces will be in compression. It will be appreciated that if the links were positioned below the suspension arm hinges then the system would become a tension system.

Figure 13:
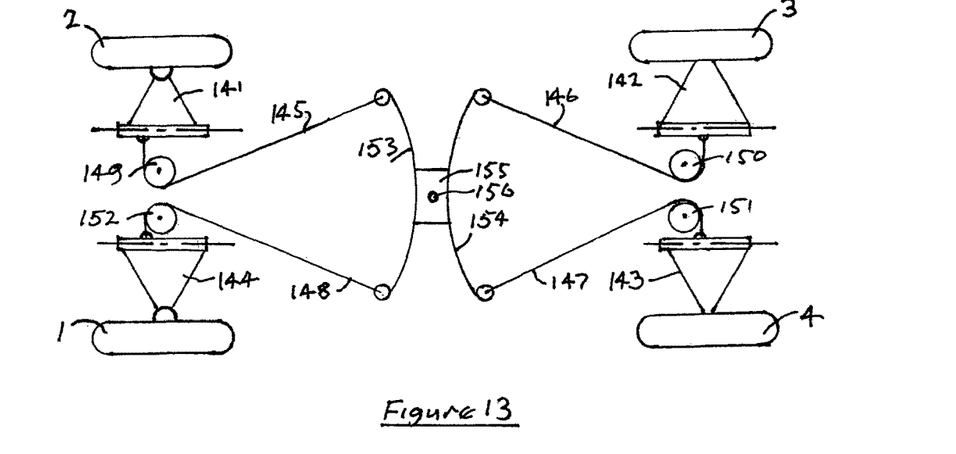
FIG. 13 is a plan view of a tension type suspension in which the links are diverted from transverse to a conventional angle, and FIG. 14 of the configuration shown in FIG. 13 and in which the suspension arms are augmented by lower wishbones.

In FIG. 13 wheels 1,2,3 and 4 are mounted on suspension arms 141, 142, 143 and 144, hinged approximately longitudinally. Below these hinges and attached to the arms are links in the form of cables 145, 146, 147 and 148 which pass over pulleys 149,150, 151 and 152 mounted pivotally on the chassis, not shown. The cables 145 and 148 are fixed to leaf spring 153 and cables 146 and 147 are fixed to leaf spring 154. The leaf springs 153 and 154 form the hub by being mounted on the fulcrum block 155 enabling the hub to rotate about the fulcrum 156.

Figure 14:
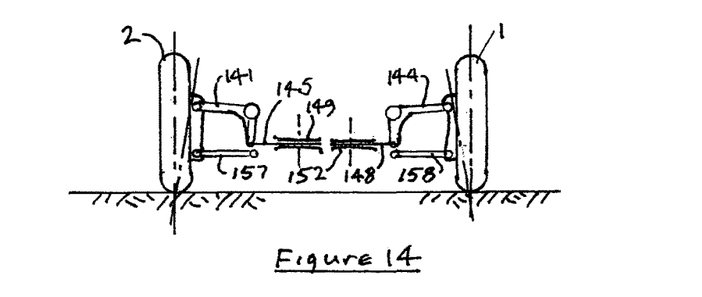

The front elevation FIG. 14 of the arrangement shown in FIG. 13 has wheels 1 and 2 mounted at the ends of suspension arms 144 and 141 respectively. The road reactions applied via the wheels to the outboard ends of arms 144 and 141 are opposed at the inboard ends by forces in tension cables 148 and 145 respectively which pass over pulleys 152 and 149 mounted pivotally on the chassis, not shown. In this configuration in order to achieve a satisfactory roll centre and satisfactory camber change it is envisaged that auxiliary wishbones 157 and 158 will need to be added though not essential to the functioning of this invention. It will be appreciated that if the roles of suspension arms 141 and 144 and wishbones 157 and 158 were exchanged such that 157 and 158 become the suspension arms and 141 and 144 the auxiliary wishbones then it would become a compression system and the links would have to be compression members diverted by elbows similar to 127, 128, 129 and 130 of FIG. 12 rather than the pulleys 149 and 152.

The invention claimed is:

1. A vehicle suspension for supporting a body or chassis of a vehicle, said vehicle suspension comprising:
   a first set of two suspension arms configured to position respectively at opposite sides and at one end of the vehicle;
   a second set of two suspension arms configured to position respectively at opposite sides and at the other end of the vehicle,
   each of the suspension arms being mounted for pivotal movement about a respective hinge axis; and
   a balancing hub for attachment to the body or chassis of the vehicle in a configuration in which at least one part of the balancing hub is free to rotate relative to the body or chassis of the vehicle about at least one pivotal position, an axis of which is substantially vertical, each one of the suspension arms being connected to the balancing hub at a position of the one respective suspension arm that is spaced from the respective hinge axis whereby pivotal movement of the one respective suspension arm applies a first force to the balancing hub, said first force applied to the balancing hub by the one respective suspension arm opposing a second force from another one of the suspension arms at at least one of a same side and a same end of the vehicle suspension,
   at least one of the balancing hub and one or more of connections between the balancing hub and the suspension arms comprising resilient material,
   wherein, in use, vertical movement of one of the suspension arms induces an opposite vertical movement of another one of the suspension arms which is at the same side of the vehicle and another one of the suspension arms which is at the same end of the vehicle,
   wherein at least one of the suspension arms is connected to the balancing hub by at least one respective link which extends from the balancing hub to a position of the respective suspension arm spaced from the respective hinge axis of the respective suspension arm, the at least one link comprising a resilient member, and the vehicle suspension is a zero warp stiffness suspension.

2. The suspension according to claim 1, wherein at least one of the suspension arms is connected to the balancing hub by at least one respective link which extends from the balancing hub to a position of the respective suspension arm spaced from the respective hinge axis of the respective suspension arm, said at least one link being extendable.

3. The suspension according to claim 1, wherein said at least one link is flexibly connected to one or more of the balancing hub and one of the suspension arms.

4. The suspension according to claim 3, wherein the at least one link is connected to the balancing hub by at least one of a hinge, a ball joint, a universal joint, and an elastomeric joint.

5. The suspension according to claim 1, wherein the at least one the link is flexibly connected to the respective suspension arm.

6. The suspension according to claim 1, wherein the balancing hub comprises a solid body of elastomeric material.

7. The suspension according to claim 1, wherein the balancing hub is configured to pivotally mount relative to the body or chassis of the vehicle about at least two spaced apart and substantially parallel axes of rotation.

8. The suspension according to claim 1, wherein the balancing hub comprises a plurality of flexible members.

9. The suspension according to claim 8, wherein the flexible members are interconnected with one another at at least one position which is in addition to interconnection of the flexible members to a position at which the hub is configured to be mounted relative to the body or chassis of the vehicle.

10. The suspension according to claim 8, wherein at least one of the flexible members is one of a metallic spring and an elastomeric spring.

11. The suspension according to claim 1, wherein the balancing hub is a solid body of rigid material.

12. The suspension according to claim 1, wherein the balancing hub comprises an attachment configured to non-rotatably secure to the body or chassis of the vehicle, and deformable regions positioned outwards of said attachment, the deformable regions being free to deform relative to the attachment thereby allowing rotation of the balancing hub relative to the vehicle body or chassis to be resisted.

13. The suspension according to claim 1, wherein the balancing hub comprises an attachment configured to attach to the body or chassis of the vehicle, said attachment being configured to restrict an angle of rotation of the attachment relative to the body or chassis of the vehicle.

14. The suspension according to claim 1, wherein, in use, pivotal movement of the respective suspension arm applies to the balancing hub a force which in magnitude and direction opposes approximately a force from the other one of the suspension arms on the same side or same end but not from a diagonally opposite one of the suspension arms.

15. The suspension according to claim 1, wherein the balancing hub is configured to augment or provide springing for the suspension.

16. The suspension according to claim 1, wherein the balancing hub comprises an attachment configured to attach to a body or chassis, said attachment being configured to control at least one of a rate and an extent of rotation of the balancing hub relative to the vehicle body or chassis.

17. The suspension according to claim 16, wherein said attachment comprises at least one of a friction device and a viscous damper.

18. The suspension according to claim 16, wherein said attachment is preset to determine at least one of the rate and the extent of rotation of the balancing hub relative to the vehicle body or chassis, said attachment being operable in use of the suspension to vary at least one of the rate and the extent of rotation of the hub relative to the vehicle body or chassis.

19. The suspension according to claim 1, wherein each of the suspension arms is configured to rotatably support a vehicle wheel, an orientation of an axis of rotation of each vehicle wheel of a plurality of wheels being independent from the orientation of each axis of rotation of other wheels of the plurality of wheels.

20. A vehicle comprising:

the body or chassis having secured thereto the vehicle suspension according to claim 1.

21. The vehicle according to claim 20, wherein the vehicle body or chassis comprises a restraint system configured to resist rotation of at least part of the balancing hub relative to the vehicle body or chassis.

22. The vehicle according to claim 20, further comprising bumper stops configured to limit an angle through which the balancing hub is configured to rotate relative to the vehicle body or chassis.

23. The vehicle according to claim 20, wherein the balancing hub is a solid body pivotally fixed at a center point of the balancing hub to the vehicle.

24. A vehicle suspension for supporting a body or chassis of a vehicle, said vehicle suspension being a zero warp stiffness suspension, the vehicle suspension comprising:

a first set of two suspension arms configured to position respectively at opposite sides and at one end of a vehicle;

a second set of two suspension arms configured to position respectively at opposite sides and at the other end of a vehicle, each of the suspension arms being mounted for pivotal movement about a respective hinge axis;

a balancing hub for attachment to the body or chassis of the vehicle in a configuration in which at least one part of the balancing hub is free to rotate relative to the body or chassis of the vehicle about at least one pivotal position, an axis of which is substantially vertical, each one of the suspension arms being connected to the balancing hub at a position of the one respective suspension arm spaced from a respective hinge axis whereby pivotal movement of the one respective suspension arm applies a first force to the balancing hub, said first force applied to the balancing hub by the one respective suspension arm opposing a second force from another one of the suspension arms at at least one of a same side and a same end of the vehicle suspension, at least one of the balancing hub and one or more of connections between the balancing hub and the suspension arms comprising resilient material, wherein, in use, vertical movement of one of the suspension arms induces an opposite vertical movement of another one of the suspension arms which is at a same side of the vehicle and another one of the suspension arms which is at a same end of the vehicle, and wherein at least one of the suspension arms is connected to the balancing hub by at least one respective link which extends from the balancing hub to a position of the respective suspension arm spaced from the respective hinge axis of the respective suspension arm, said at least one link being extendable.

25. The suspension according to claim 24, wherein said at least one link is flexibly connected to one or more of the balancing hub and one of the suspension arms.

26. A vehicle suspension for supporting a body or chassis of a vehicle, said vehicle suspension being a zero warp stiffness suspension, the vehicle suspension comprising:
a first set of two suspension arms configured to position respectively at opposite sides and at one end of the vehicle;
a second set of two suspension arms configured to position respectively at opposite sides and at the other end of the vehicle,
each of the suspension arms being mounted for pivotal movement about a respective hinge axis; and
a balancing hub for attachment to the body or chassis of the vehicle in a configuration in which at least one part of the balancing hub is free to rotate relative to the body or chassis of the vehicle about at least one pivotal position, an axis of which is substantially vertical, each one of the suspension arms being connected to the balancing hub at a position of the one respective suspension arm that is spaced from the respective hinge axis whereby pivotal movement of the one respective suspension arm applies a first force to the balancing hub, said first force applied to the balancing hub by the one respective suspension arm opposing a second force from another one of the suspension arms at at least one of a same side and a same end of the vehicle suspension,
at least one of the balancing hub and one or more of connections between the balancing hub and the suspension arms comprising resilient material,
wherein, in use, vertical movement of one of the suspension arms induces an opposite vertical movement of another one of the suspension arms which is at the same side of the vehicle and another one of the suspension arms which is at the same end of the vehicle,
wherein at least one of the suspension arms is connected to the balancing hub by at least one respective link which extends from the balancing hub to a position of the respective suspension arm spaced from the respective hinge axis of the respective suspension arm, the at least one link comprising a resilient member, and
wherein, in use, pivotal movement of the respective suspension arm applies to the balancing hub a force which in magnitude and direction opposes approximately a force from the other one of the suspension arms on the same side or same end but not from a diagonally opposite one of the suspension arms.

27. A vehicle suspension for supporting a body or chassis of a vehicle, said vehicle suspension comprising:
a first set of two suspension arms configured to position respectively at opposite sides and at one end of the vehicle;
a second set of two suspension arms configured to position respectively at opposite sides and at the other end of the vehicle,
each of the suspension arms being mounted for pivotal movement about a respective hinge axis; and
a balancing hub for attachment to the body or chassis of the vehicle in a configuration in which at least one part of the balancing hub is free to rotate relative to the body or chassis of the vehicle about at least one pivotal position, each one of the suspension arms being connected to the balancing hub at a position of the one respective suspension arm that is spaced from the respective hinge axis whereby pivotal movement of the one respective suspension arm applies a first force to the balancing hub, said first force opposing a second force from another one of the suspension arms at at least one of a same side and a same end of the vehicle suspension,
at least one of the balancing hub and one or more of connections between the balancing hub and the suspension arms comprising resilient material,
wherein, in use, vertical movement of one of the suspension arms induces an opposite vertical movement of another one of the suspension arms which is at the same side of the vehicle and another one of the suspension arms which is at the same end of the vehicle, and
wherein the balancing hub comprises
an attachment configured to non-rotatably secure to the body or chassis of the vehicle, and
deformable regions positioned outwards of said attachment, the deformable regions being free to deform relative to the attachment thereby allowing rotation of the balancing hub relative to the body or chassis to be resisted.

* * * * *